Sept. 5, 1939.  N. D. GERINGER  2,171,548

GRASS CATCHER FOR LAWN MOWERS

Filed April 3, 1937

INVENTOR.
Nicholas D. Geringer
BY Sam J. Slotsky
ATTORNEY

Patented Sept. 5, 1939

2,171,548

UNITED STATES PATENT OFFICE 2,171,548

GRASS CATCHER FOR LAWN MOWERS

Nicholas D. Geringer, Marcus, Iowa

Application April 3, 1937, Serial No. 134,760

1 Claim. (Cl. 56—200)

My invention relates to a gathering and dumping attachment for lawn mowers.

An object of my invention is to provide a catching unit which can be manually worked so that it dumps the grass without removal of the said unit.

A further object of my invention is to provide a device of this character which efficiently rakes or gathers the grass during the forward progress of the cutting means of the lawn mower.

A further object of my invention is to provide the above characteristics in a construction of great simplicity which can be manufactured at a reasonable cost.

Figure 1:
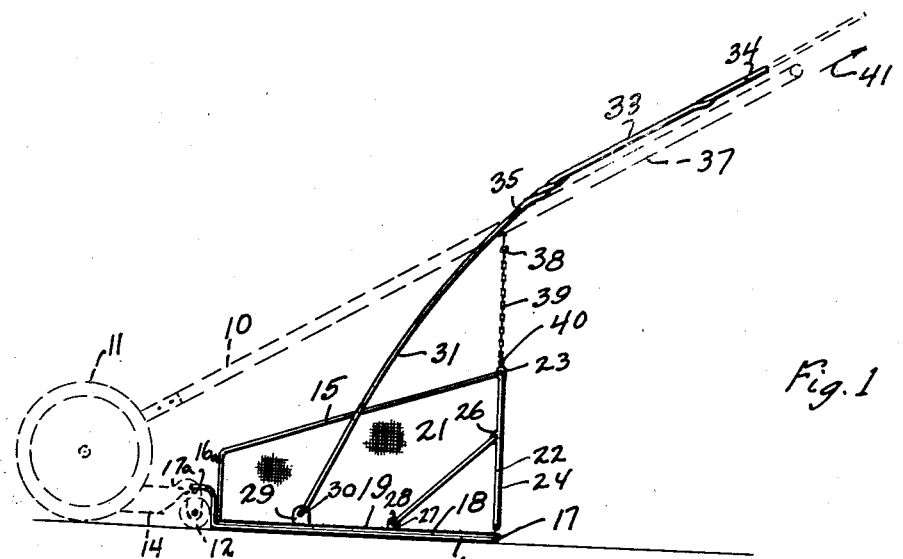
Figure 2:
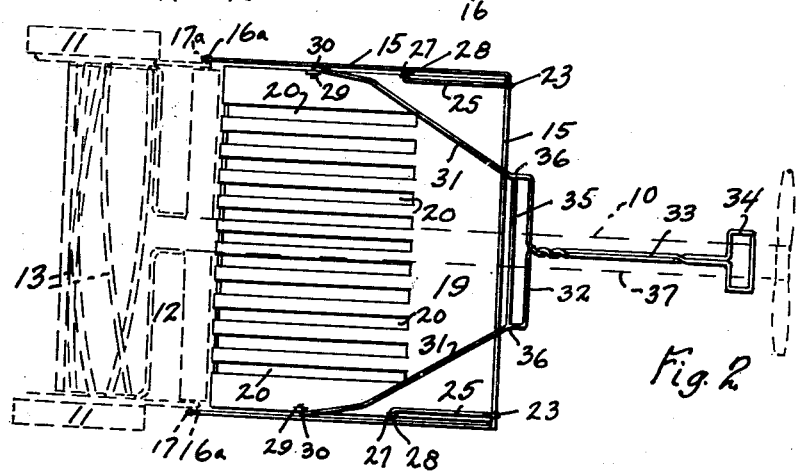
Figure 3:
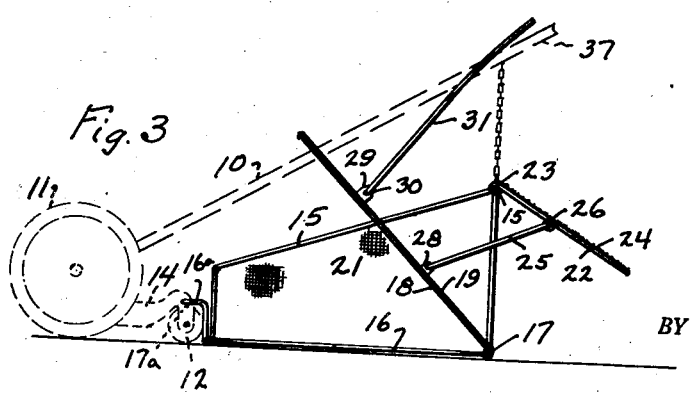

With these and other objects in view, my invention consists in the construction, arrangement and combination of the various parts of my device, whereby the objects contemplated are attained, as hereinafter more fully set forth, pointed out in my claim, and illustrated in the accompanying drawing, in which:

Figure 1 is a side elevation of the device during the normal cutting operation of the lawn mower, Figure 2 is a plan view of the same, and Figure 3 is a side elevation showing the device in the dumping position.

The ordinary grass catching container, which is usually situated at the rear of the lawn mower involves various difficulties, among which is the fact that the container must be completely removed from the lawn mower in order to empty the same. Furthermore, the passage of the container across the cutting surface does not efficiently gather up or clean away all the blades of grass from the ground.

A principal object of my invention is to eliminate these various difficulties by the provision of suitable elements so arranged, that such difficulties are overcome.

I have used the character 10 to designate generally the lawn mower handle and it will be understood throughout the description that all the elements pertaining to the lawn mower are dotted and the elements pertaining to my invention are solid in order to facilitate proper understanding of the device. The lawn mower wheels are indicated by the character 11 and the usual roller by the character 12, with the lawn mower blades being indicated by the character 13, and the rear brackets by the character 14.

My device comprises the rectangular wire framework member 15 which is open at the end adjacent the roller 12. The member 15 terminates in a pair of hook members 16a which hook over the usual projections 17a. The framework 15 also continues into the lower horizontal portion or framework 16 which forms a complete rectangle which is the base of the device. Pivoted at 17 is a further rectangular member 18 to which is attached the metal base plate 19. The base plate 19, which is made of relatively thin sheet metal, includes a series of lengthened open slots 20 projecting from the forward portion thereof substantially towards the rear of the device.

It will be noted that the sides of the framework 15 (see Figs. 1 and 3), are lower at the forward portion and rise towards the rear. A canvas cover 21 is attached about the members 15 and 16 to form the sides of the catching device. The rear of the device is provided by means of the wire formation 22 which is pivoted at 23 to the cross portion 15. The space between the wires of the member 22 is completely covered by means of a further canvas 24, which is attached thereto. This member then provides the rear of the device.

A pair of rods 25 are received within loops 26, which loops are integral portions of the wire 22 and a pair of ears 27 are bent upwardly and integrally, if desired, from the metal base 19 and the ends of the rods 25 are received at 28 therethrough. A further pair of ears 29 are attached to or bent from the metal 19, which ears are adapted to receive at 30, through suitable openings the upwardly projecting pair of wire arms 31. The wire arms 31 extend into the formation at 32 and thence into the straight portion at 33 upwardly to the handle 34.

A cross bar is provided at 35, which is attached at 36 between the members 31. It will be noted particularly from Fig. 1 that the cross bar and the upper portions rest on or above the upper lawn mower handle which I have indicated by the character 37.

The lower container framework is supported from the hook 38, which is attached from the handle by means of the chain 39, which is attached at 40 to a suitable hook so that the lower framework is supported from the lawn mower handle 37. It will be understood that the entire device is constructed of stiff wire suitably covered where necessary with canvas and that the wire formation can be made integral so that it will not be necessary to use too many pieces of the same. Now that the structure of my device has been explained, I shall explain its operation.

Figure 1 shows the device in normal cutting position and all the grass which is being cut will naturally be drawn onto the base plate 19, and will be suitably retained within the framework and since the rear canvas 24 is vertically positioned the grass can not escape from the container. During the forward movement of the container which rests practically flush upon the ground surface, any loose piece of grass and the like will be efficiently scraped up or caught by the slots 20 so that the raking action imparted, gathers all of the grass and the like leaving a clean surface. When it is desired to dump the container the following operation takes place. The handle 34 is grasped by the operator and pulled towards the body in the direction indicated by the arrow 41 in Figure 1 and as indicated by the dotted lines. This causes the wire rods 31 to be pulled upwardly, thereby lifting the base plate 19 through the pivotal action at 30. As the base plate 19 is lifted, the rods 25 are also forced upwardly (see Fig. 3), and rearwardly and due to the pivotal character of the rods 25 at 28 and 26, the rear member 22 is forced rearwardly and angularly as shown. This action causes the grass to slide off the base plate 19 and through the now open rear of the container so that the same can be deposited at any place without the necessity of removing the container itself. After this operation, the handle 34 is allowed to drop into normal position, when the device is again ready for normal operation.

It will now be seen from the foregoing construction that I have provided a mechanism and device which conveniently allows removal of grass from a grass catcher without the necessity of removing the catcher itself, that I have provided means for conveniently gathering the grass during the mowing operation, that such gathering means insures a positive scraping action along the maximum amount of surface, that I have provided means for dumping the grass contained in the catcher, which means are conveniently operated by the hand and from a normal working position. It will also be seen that I have provided the above mentioned features in a construction of great simplicity which can be manufactured at a reasonable cost.

Some changes may be made in the construction and arrangement of the parts of my invention without departing from the real spirit and purpose of my invention, and it is my intention to cover by my claim any modified forms of structure or use of mechanical equivalents, which may be reasonably included within its scope.

I claim as my invention:

A grass catcher for lawn mowers having a handle comprising a rear catcher including a base pivoted to the rear thereof, means for tilting the base including a pair of arms pivotally attached to said base and extending upwardly and over the lawn mower handle, a raising member extending from said arms, said raising member terminating in an integral grasping handle adapted to overlie the lawn mower handle, said catcher including a rear wall pivoted to the upper rear of the catcher, means operable by said base to pivot said wall to cause opening of the catcher, said means including a pair of rods pivoted to said rear wall and to said base, said raising member including an upward extension adapted to lie substantially parallel to the lawn mower handle, hand engaging means attached thereto.

NICHOLAS D. GERINGER.